Figure 1:
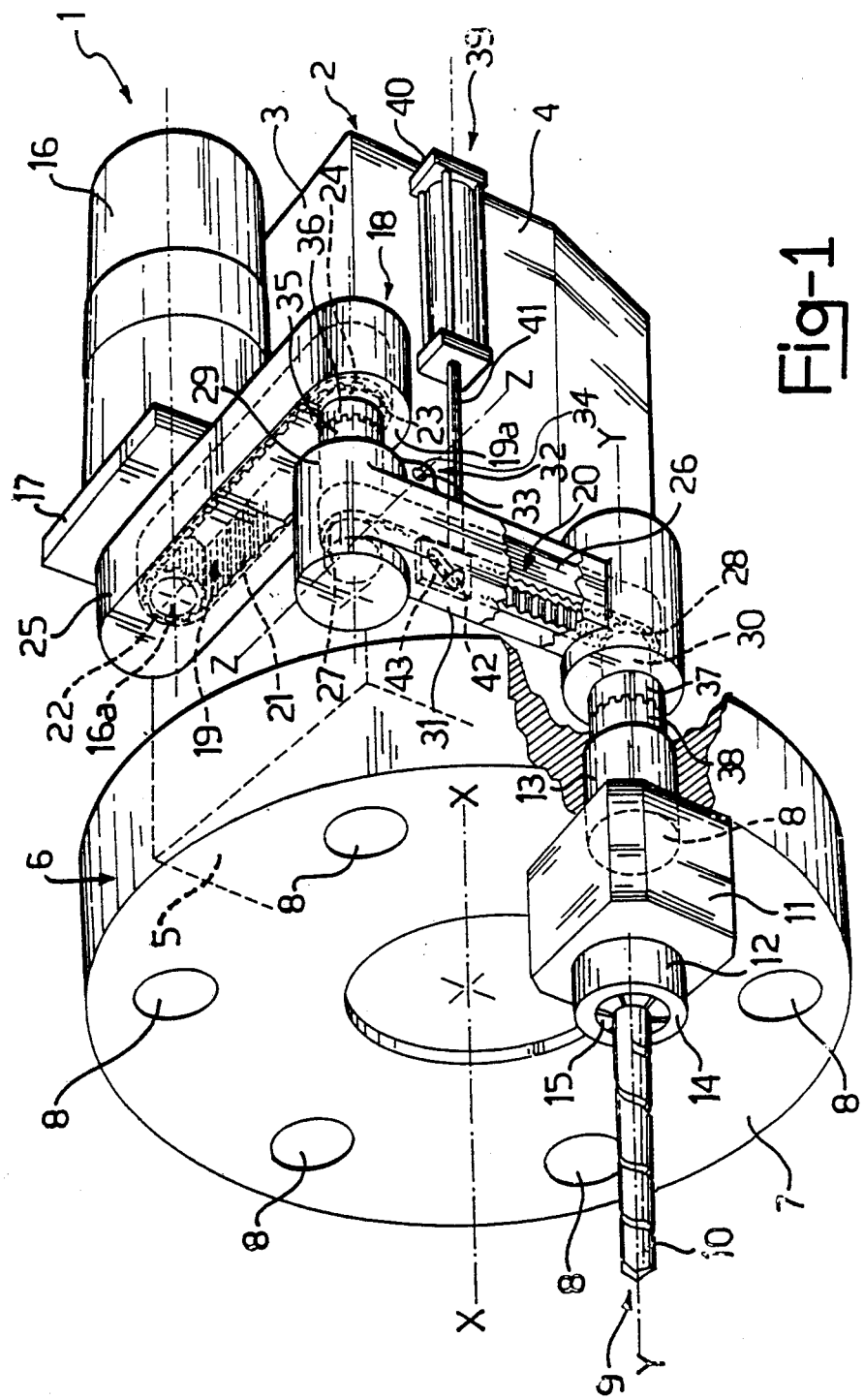

United States Patent [19]

De Bernardi

[11] Patent Number: 4,799,410
[45] Date of Patent: Jan. 24, 1989

[54] REVOLVING TURRET PARTICULARLY FOR LATHE MACHINING CENTERS

[75] Inventor: Franco De Bernardi, Busto Arsizio, Italy

[73] Assignee: Duplomatic S.p.A., Italy

[21] Appl. No.: 905,395

[22] Filed: Sep. 10, 1986

[30] Foreign Application Priority Data

Sep. 13, 1985 [IT] Italy .................. 22152 A/85

[51] Int. Cl.⁴ .................................... B23B 29/00
[52] U.S. Cl. .................................... 82/36 A; 74/813 R
[58] Field of Search ............... 82/36 A; 408/35; 74/813 R, 813 L, 813 C, 816, 817, 825, 826; 29/27 R, 27 C, 36, 39, 40, 48.5 R, 48.5 A, 49

[56] References Cited

U.S. PATENT DOCUMENTS 4,057,881 11/1977 Stephens .................. 29/40

FOREIGN PATENT DOCUMENTS 128089 10/1979 Japan .................. 82/36 A
227303 12/1984 Japan .................. 82/36 A
2135619 9/1984 United Kingdom .......... 82/36 A Primary Examiner—Frederick R. Schmidt
Assistant Examiner—Robert L. Showalter
Attorney, Agent, or Firm—Vinson & Elkins

[57] ABSTRACT

A multi-setting revolving turret particularly useful with a lathe machining center, comprises a base body, a tool head rotatable in the base body, at least one chuck in said head for a drill bit or cutter tool, a motor supported on the base body to drive said chuck through a drive train, wherein an element of the drive train is mounted on the base body in a hide-away shiftable fashion between an operative position of engagement with the chuck and an inoperative position of disengagement from the chuck.

2 Claims, 2 Drawing Sheets

REVOLVING TURRET PARTICULARLY FOR LATHE MACHINING CENTERS

DESCRIPTION

This invention relates to a revolving turret particularly for lathe machining centers, of a type which comprises:

a base body, a tool head carried rotatably on the base body, at least one chuck carried rotatably on the head, a drive motor carried on the base body, a drive train between the motor and chuck, and clutch means at the end of said drive train for engagement with mating clutch means carried on said chuck.

As is known, lathe machining centers are to perform multiple operations on a workpiece, including drilling, cutting, boring, and the like operations, that is, so-called rotary tool machining operations.

Accordingly, the tool head will mount not only turning tools but also at least one spindle unit having a suitable chuck to accommodate a desired tool type, such as a drill bit, cutter, and the like.

Upon the tool head reaching a required angular setting to bring the rotary tool to the working station, the chuck clutch means and mating clutch means of the drive train will align to each other and become engageable. Thus, the tool is rotated by the motor.

That turret is usually installed on the lathe machining center such that the axis of rotation of the head lies parallel to the centerline of the machining center, i.e. parallel to the common axis of the head and tailstock.

Now, conventional design turrets hardly suit the above installation. In fact, the drive train provided for transmitting the motion from the motor to the chuck is located in the very path followed by the tailstock. Thus, when the turret is to perform standard machining operations on a workpiece with the turning tools set in it, operation of the tailstock, as required in such cases to provide increased support for the workpiece, is either seriously hampered or altogether precluded. This limitation is specially important where roughmachining is carried out, owing to the likelihood of vibrations setting in.

To obviate the problem, a turret has been suggested wherein the drive train includes a shaft journalled within the tool head coaxially therewith and being driven at one end by the electric motor, its other end driving, in turn, the chuck through gearing accommodated within the head.

That approach, wherein the drive train is substantially fully accommodated inside the base body, does afford unrestricted mobility for the tailstock but is of complex and, hence, expensive construction. It will be sufficient to consider that there must be as many gear trains provided as are the turret settings, in order to enable installation of one or more spindle units indifferently at various positions. This complicated construction, moreover, deteriorates the mechanical efficiency of the drive from the motor to the chuck.

Another drawback of that prior approach is that it involves decreased rigidity of the turret construction, and especially of the tool head, which should be ideally a solid one-piece block with barely enough machining to enable attachment of tools and mounting the spindle unit.

It should be also noted that, as a rule, it would be impractical to provide the turret with a spindle unit with its motor incorporated therein, e.g. of the kind of the so-called electric or pneumatic motor chucks. Such units, in fact, are either of excessively low power or become so large in size as to strike the base body, or possibly even structures of the lathe machining center, in their evolution during the tool head rotation.

The problem underlying this invention is to provide a turret as indicated which has such constructional and operational features as to fill the above-mentioned requisite, while overcoming the cited drawbacks in connection with the state of the art.

This problem is solved by a turret of the type specified above, which is characterized in that at least one element in said drive train, including at one end said clutch means, is mounted on the base body in a hideaway shiftable fashion.

Figure 2:
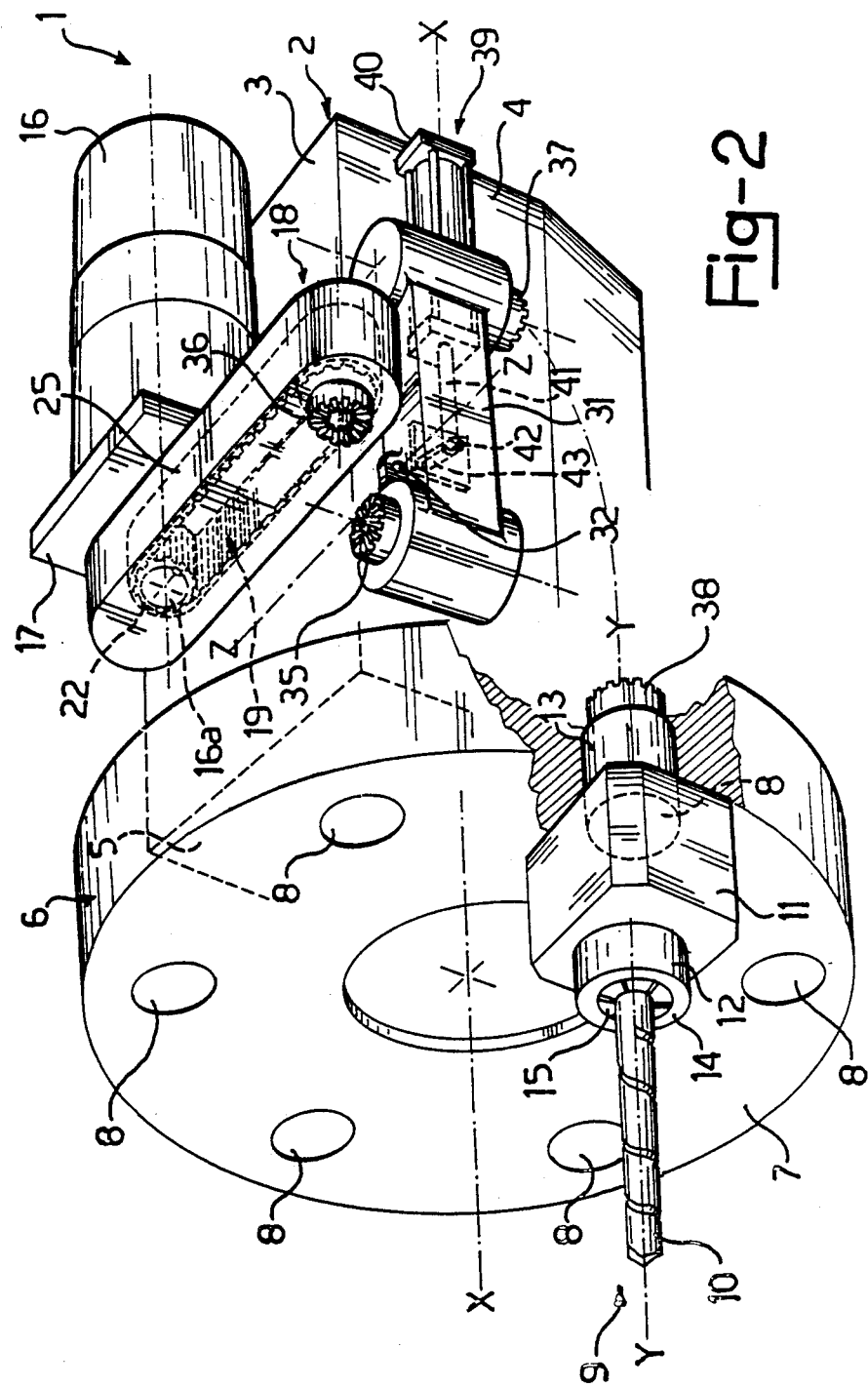

Further features and advantages of a turret according to this invention will become apparent from the following description of a preferred embodiment thereof, given here by way of illustration and not of limitation, with reference to the accompanying drawings, where:

FIG. 1 is a part-sectional perspective view of a turret according to the invention; and FIG. 2 is a perspective view of the turret of FIG. 1 showing it at another stage of its operation.

With reference to the accompanying drawing figures, the numeral 1 designates generally a revolving turret with six settings, which is particularly designed to fit generic machine tools and specifically lathes and so-called lathe machining centers or turning centers.

The turret 1 comprises a base body 2, of substantially parallelepipedic horizontally elongate shape, which has a top wall 3, front wall 4, and face wall 5, and is intended for mounting to the machining center by its rear and/or lower wall.

The turret 1 comprises a tool head 6 which is carried on the base body 2 for rotation about an axis X—X extending along the base body. Means, not shown and conventional per se, are provided at the edge of the base body 2 to drive the tool head 6 rotatively and stepwise.

In particular the tool head 6 comprises a disk 7 having an axis X—X, located in front of the face wall 5 and having its periphery projecting from the body 2 at least on the same side as its front wall 4.

Provided on the disk 7 are six settings, comprehensively indicated at 8 whereat respective tools would be mounted. Each of the settings 8 would be taken in succession to a working station, indicated at 9, said station 9 being located on the same side as the front wall 4 of the body 2.

In the example shown, the disk 7 mounts a single tool consisting of a drill bit 10 placed at that setting 8 which is shown at the working station 9.

In particular, indicated at 11 is a spindle unit, supported on the disk 7 and carrying a chuck 12 mounted rotatably in said unit whose axis Y—Y extends parallel to the axis X—X.

The chuck 12 has one end 13 projecting from the disk 7 toward the body 2, through which it is driven rotatively as explained hereinafter, and has the other end 14 provided with a grip 15 for holding the drill bit 10.

The turret 1 is advantageously adapted for mounting on the machining center with the axis X—X lying parallel to the turning axis of the machining center, with the disk 7 facing the head of the machining center and the body 2 facing the tailstock.

To drive the chuck 12, and accordingly the drill bit 10, rotatively, the turret 1 includes an electric motor 16 mounted to the wall 3 by means of a right-angle flange 17 and having its axis parallel to the axis X—X, as well as a drive train, generally indicated at 18, which extends between the electric motor 16 and the chuck 12.

The drive train 18 comprises a first element formed of a belt drive 19 and a second element formed of a further belt drive 20.

The belt drive 19 comprises a cogged belt 21 stretched between two pulleys 22 and 23. The pulley 22 is keyed to the shaft 16a of the motor 16, and the pulley 23 is keyed to a shaft 24 which is journalled in a box-type body 25, which is attached to the top wall 3 through the right-angle flange 17 and accommodates the drive 19 case-like on its interior.

The drive 19 extends horizontally and perpendicularly to the axis X—X and projects with a portion 19a from the body 2 on the same side as the wall 4.

The belt drive 20 comprises a cogged belt 26 stretched between two pulleys 27 and 28 keyed to respective shafts 29 and 30, which are journalled in an arm 31 of box-like construction enclosing the drive 20 case-like. The arm 31 is located forwardly of the wall 4 of the base body 2 and is connected hingedly thereto via a hinge 32 which has its pivot axis Z—Z horizontal and perpendicular to the axis X—X. In particular, the hinge 32 is embodied by a pin 33 made fast with the base body 2 and an eye 34 formed integrally with the arm 31 at an intermediate point thereon.

The box-like arm 31 is shiftable angularly to hide away about the hinge axis Z—Z, under the action of control means to be explained herein below, from a first position where it is vertically upright and positioned between the disk 7 and the portion 19a of the belt drive 19, to a second position where it lies horizontally.

With the arm 31 in its first position, the shaft 29 is aligned to the shaft 24, and the shaft 30 is aligned to the chuck 12. It should be noted that the shaft 29 has a projecting end from the arm 31 which is provided with clutch means 35 in engagement with mating clutch means 36 mounted on the shaft 24 at one end thereof projecting from the box-type body 25.

Likewise, the shaft 30 has a projecting end from the arm 37 provided with clutch means 37 engaged with mating clutch means 38 equipping the chuck 12 at the end 13 thereof, for driving the chuck rotatively and controllably as required.

The control means for shifting the arm 31 angularly between its first and second positions comprise a hydraulically or air-operated cylinder-piston assembly which extends horizontally in spaced apart relationship with the axis Y—Y. Said cylinder-piston assembly 39 has its cylinder 40 mounted to the wall 4 of the base body, and acts on the arm 31 through its piston rod 41, which has its free end 42 provided with a pin 43 in engagement with a slot 43 formed in the arm 31.

The operation of the turret 1 of this invention will be now described in connection with a starting condition, depicted in FIG. 1, wherein operative at the working station 9 is the setting 8 of the disk 7 holding the drill bit 10, and the arm 31 is in its first position. This is an operational position of the arm 31 because the drive train 18 enables, through its elements 19 and 20, the motion to be taken from the electric motor 16 to the chuck 12. In that condition, the clutch means 37 placed at the end of the drive train 18, and specifically at the end of its element 20, will engage with the mating clutch means 38 of the chuck 12, whilst the clutch means 35 which are placed at the opposite end of the element 20 will engage with the mating clutch means 36 of the remaining element 19 of the drive train 18.

On completion of a desired drilling operation, and where another machining operation is to be carried out by means of any appropriate tool mounted to the disk 7 at any of the remaining settings 8, the cylinder-piston assembly 40 is operated, thereby the arm 31 is shifted angularly from its vertical position to its horizontal position, thus establishing the condition shown in FIG. 2. With the arm so positioned, the element 20 of the drive train is inoperative, because of the clutch means 35 and 37 disengaging themselves from their corresponding, mating clutch means 36 and 38 during the arm movement from the first to the second position.

At this time, the tool head 6 is rotated until a required tool for the next machining operation is located at the station 9.

It should be noted that, in its horizontal inoperative position, the arm is held away from the axis Y—Y, and substantially side-by-side with the cylinder-piston assembly, thereby the tailstock of the machining center is allowed to move freely in the same direction as the axis Y—Y as required.

On returning the chuck 12 to the station 9 and thereafter controlling the arm in the reverse direction from its inoperative position to the operative position, the turret is brought back to its starting condition and is ready for another machining cycle.

The turret of this invention enables rotary tool machining on machining centers, with the important advantage that it affords unrestricted mobility for the tailstock.

An additional advantage of the inventive turret is that its structure is highly rigid, and especially so that of the tool head.

A not negligible advantage of the inventive turret resides in its simple construction, which brings about reliability to an unusual degree.

Of course, a skilled person in the art, in order to meet specific contingent requirements, may introduce modifications and alterations to the turret disclosed hereinabove without departing from the protection scope of the invention as defined in the appended claims.

I claim:

1. A revolving turret particularly for lathe machining centers, of a type which comprises:
   a base body;
   a tool head carried rotatably on the base body;
   at least one chuck carried rotatably on the head;
   a drive motor carried on the base body;
   a drive train between the motor and chuck; and
   clutch means at the end of said drive train for engagement with mating clutch means carried on said chuck;
   characterized in that at least one element of said drive train, including at one end said clutch means, and at the opposite end, clutch means for engagement with mating clutch means carried on the remaining elements of the drive train, is mounted, in a hideaway shiftable fashion, as an arm hinged to the base body and being shiftable angularly about the hinge axis under the action of control means from a first or operative position where the clutch means and mating clutch means are engaged, to a second or inoperative position where the clutch means and mating clutch means are disengaged, the clutch means disengaging themselves from their corresponding mating clutch means during the arm movement, said arm extends parallel to the head axis of rotation when in its inoperative position.

2. A turret according to claim 1, characterized in that the means of controlling the angular movement of the arm comprise a cylinder-piston assembly extending in a parallel direction to the head axis of rotation.

* * * * *